United States Patent [19]

Jaswa

[11] Patent Number: 4,733,353
[45] Date of Patent: Mar. 22, 1988

[54] FRAME SYNCHRONIZATION OF MULTIPLY REDUNDANT COMPUTERS

[75] Inventor: Vijay C. Jaswa, San Jose, Calif.

[73] Assignee: General Electric Company, Schenectady, N.Y.

[21] Appl. No.: 808,795

[22] Filed: Dec. 13, 1985

[51] Int. Cl.⁴ .............................................. G06F 15/16
[52] U.S. Cl. ................................................... 364/200
[58] Field of Search ............... 364/200 MS File, 300

[56] References Cited

U.S. PATENT DOCUMENTS

| | | | |
|---|---|---|---|
| 3,803,568 | 4/1974 | Higashide | 340/213 R |
| 3,896,418 | 7/1975 | Brown | 364/200 |
| 3,961,270 | 6/1976 | Ullmann et al. | 328/75 |
| 4,330,826 | 5/1982 | Whiteside et al. | 364/200 |
| 4,404,675 | 9/1983 | Karchevski | 371/47 |
| 4,408,327 | 10/1983 | Wahl et al. | 371/47 |
| 4,412,342 | 10/1983 | Khan et al. | 375/107 |

OTHER PUBLICATIONS

Smith, T. B.; "Fault Tolerant Clocking System", Digest of Papers, 11th Int'l Symposium, Charles Stark Draper Laboratory, Inc., Cambridge, Mass., pp. 262–264, Jun. 1981.

IEEE Transactions on Computers, vol. C-27, No. 6, Jun. 1978, pp. 531–539.

Primary Examiner—Raulfe B. Zache
Attorney, Agent, or Firm—Donald R. Campbell; James C. Davis, Jr.; Paul R. Webb, II

[57] ABSTRACT

A frame synchronization method and apparatus wherein each computer system of a multiply redundant processing system periodically executes a frame synchronization procedure in which it sequentially assumes a plurality of different operating states during which it pauses in the execution of a task it was performing and readies itself for synchronization, determines which other computer systems are ready for synchronization, synchronizes itself with one or more of the systems, and then determines which of the other systems has also synchronized itself. At a predetermined frame interval, the procedure is repeated and the computer systems resynchronize themselves with one another. The invention is impervious to stuck-at type faults, and may be embodied either totally or partially in software within each computer system, or in a separate hardware device.

20 Claims, 4 Drawing Figures

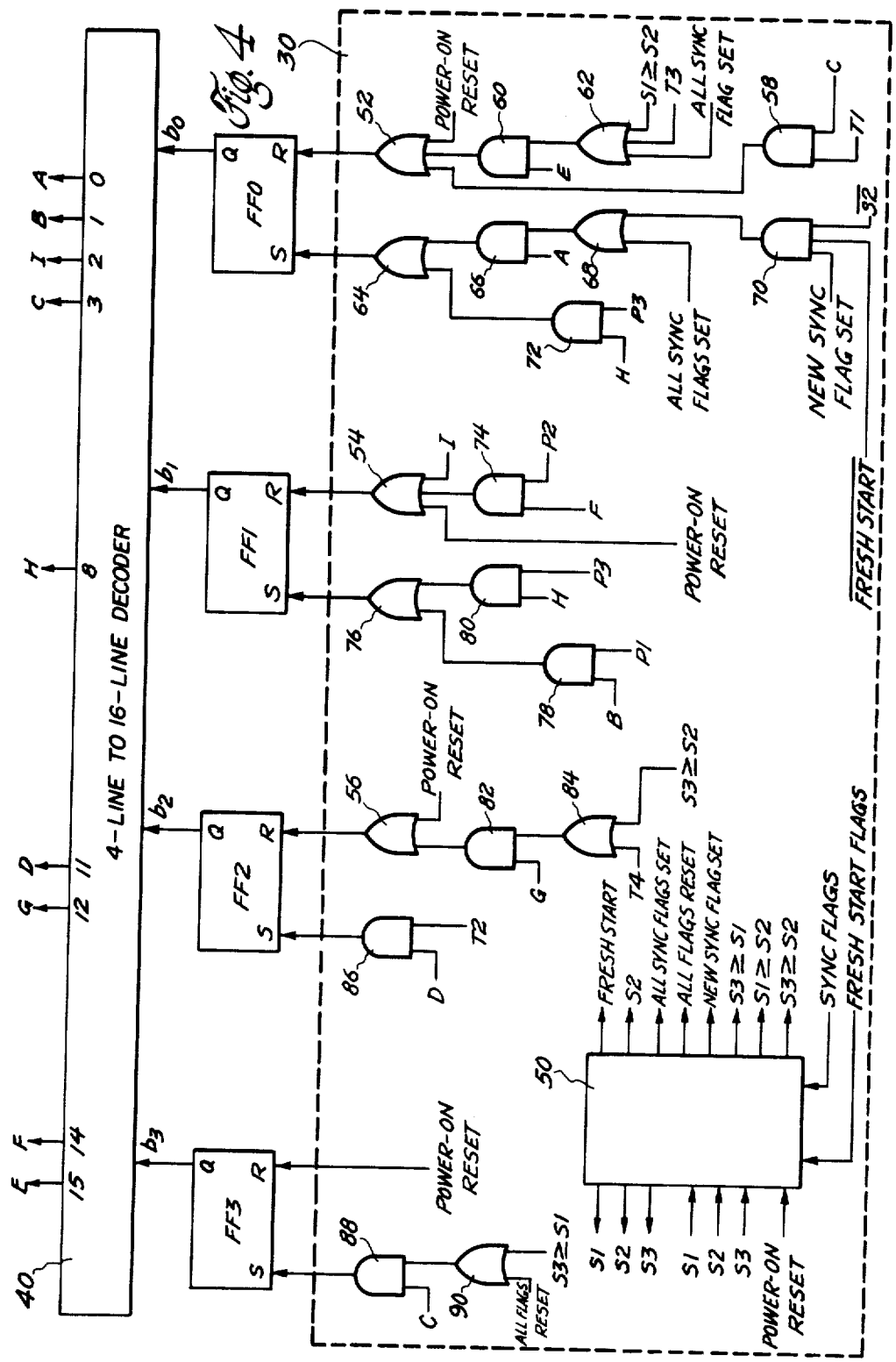

FRAME SYNCHRONIZATION OF MULTIPLY REDUNDANT COMPUTERS

BACKGROUND OF THE INVENTION

This invention relates generally to the synchronization of computers in a multiply redundant processing system, and more particularly to methods and apparatus for frame synchronizing such computers.

Fault-tolerant processing systems are employed whenever critical processes are being controlled to ensure continued correct system operation in the presence of hardware or component failures. A common way of achieving fault-tolerant processing is to employ replicated processing systems operating in parallel on the same task and to vote on their outcomes so that failures can be masked. Such systems are referred to as multiply redundant processing systems, and typically employ three or more computer systems operating in parallel. In order for the voting to be meaningful, it is necessary that each processing system be operating on the same or similar data. If bounds are described for variations in the data, then identical data need not be used in all processors. Nevertheless, in order for the data to satisfy the prescribed bounds criteria, the processing systems must be synchronized in some fashion. If three processors, for example, are to read and subsequently operate on a changing input variable, they must all read the input variable at the same time in order to arrive at identical or at least similar results. The systems may be synchronized in either an instruction-synchronous manner or in a frame-synchronous manner.

Instruction synchronism is a widely used synchronization technique. One way of achieving such synchronization is to employ phase locked loops for causing the real time clocks of the processing systems to operate in lockstep synchronism. This poses problems during initialization and when dealing with asynchronous inputs. Moreover, lockstep synchronism schemes are often prey to single point failures, pose difficulties in detecting latent faults, and are difficult to extend to more than three or four replicated processing systems. In addition, there exist certain failure modes which can cause the entire system to fail. Frame synchronization techniques differ in that the processing systems are synchronized only periodically at some predetermined frame interval and are permitted to run asynchronously between synchronizations. Frame synchronization simplifies cold start initialization and the implementation of warm starts, which is necessary to enable systems to be taken off-line for maintenance and subsequently brought back on-line and synchronized with the other systems.

Known frame synchronization methods and apparatus have several disadvantages, included among which are their relative complexity and susceptibility to certain types of faults such as "stuck-at" type faults. It is desirable to provide frame synchronization methods and apparatus which avoid such difficulties, and it is to this end that the present invention is directed.

SUMMARY OF THE INVENTION

Frame synchronization methods and apparatus in accordance with the invention may be implemented rather simply in either hardware or software, are readily expandable to accommodate easily an arbitrary number of processing systems, and are impervious to "stuck at one" or "stuck at zero" type faults.

In accordance with the invention, each computer system of a multiply redundant processing system periodically executes a frame synchronization procedure in which it sequentially assumes a plurality of different operating states during which it pauses in the execution of a task it was performing, readies itself for synchronization, determines which other computer systems are ready for synchronization, synchronizes itself with one or more of the systems, and then determines which of the other systems has also synchronized itself. After a predetermined interval of time corresponding to a frame interval, the synchronization procedure is repeated and the computer systems resynchronize themselves with each other.

More specifically, the frame synchronization procedure comprises instructing each computer system to set a sync flag and enter a first state at each frame interval and determining which computer systems have set a sync flag and defining a first set corresponding to those with sync flags set. The first set is compared to a second set of computer systems which during a prior frame interval had set and then reset their sync flags and a transition to a second state is made upon a first predetermined condition being satisfied. The computer system is then instructed to reset its sync flag and to transition to a third state after a first predetermined pause and to resume normal processing. The computer systems which have reset their sync flags are then determined and a corresponding third set is defined. The third set is compared with the second set and the computer system transitions to a fourth state upon the comparing satisfying a second predetermined condition. After a second predetermined pause, a transition is made to a fifth state in which a new second set is determined corresponding to those computer systems which had set and then reset their sync flags during the transitions from the first to the fifth states. Thereafter, the procedure is repeated at each frame interval.

In accordance with another aspect, the invention affords an apparatus for synchronizing a plurality of computer systems that comprises, for each system, a frame interval timer for timing a predetermined frame interval; means for instructing the computer system at each frame interval to set a sync flag and to enter a first state; means for detecting a first set of computer systems which have set sync flags; means for comparing the first set to a second set of computer systems which had set and then reset sync flags during a prior frame interval; means responsive to the comparing means for transitioning to a second state upon a first predetermined condition being satisfied; means for instructing the computer system to reset its sync flag and to transition to a third state after a first predetermined pause; means for detecting in the third state the computer systems having sync flags reset and for defining a corresponding third set of computer systems; means for comparing the third set with the second set and for causing the computer system to enter a fourth state upon the comparing satisfying a second predetermined condition; means for entering a fifth state after a second predetermined pause, and means operable in the fifth state for redefining the second set as those computer systems which had set and then reset their sync flags during said transition.

When the system is initialized from a cold start or when a computer system is brought back on-line for synchronization with computer systems that are running, a different synchronization procedure is followed. Upon power-on of a computer system, the second set, corresponding to those of the computer systems which had set and then reset sync flags is defined to be a null set. A fresh start flag and a sync flag are set, and the computer system is instructed to transition to a sixth state upon a third predetermined condition being satisfied. In the sixth state, the first set of computer systems having sync flags set is redetermined and a transition is made to a seventh state after a third predetermined pause. In the seventh state, the computer system is instructed to reset its sync flag and its fresh start flag and to transition to the fifth state upon a fourth predetermined condition being satisfied. Once in the fifth state, the computer system is in synchronization with the other computers and will execute the normal frame synchronization procedure at the next frame interval.

BRIEF DESCRIPTION OF THE DRAWINGS

FIG. 4 is a schematic block diagram illustrating a portion of the synchronizer of FIG. 2.

DESCRIPTION OF THE PREFERRED EMBODIMENT

The invention is capable of affording frame synchronization of an arbitrary number of independently operating systems, such as the processors or computers in a multiple redundant processing system. In order to facilitate a description of the invention, it will be described in connection with the synchronization of three computers in a triple modular redundant (TMR) computer processing system. However, as will become apparent, the invention may easily accommodate a greater or lesser number of processors, and may be employed for synchronizing other types of systems.

Figure 1:
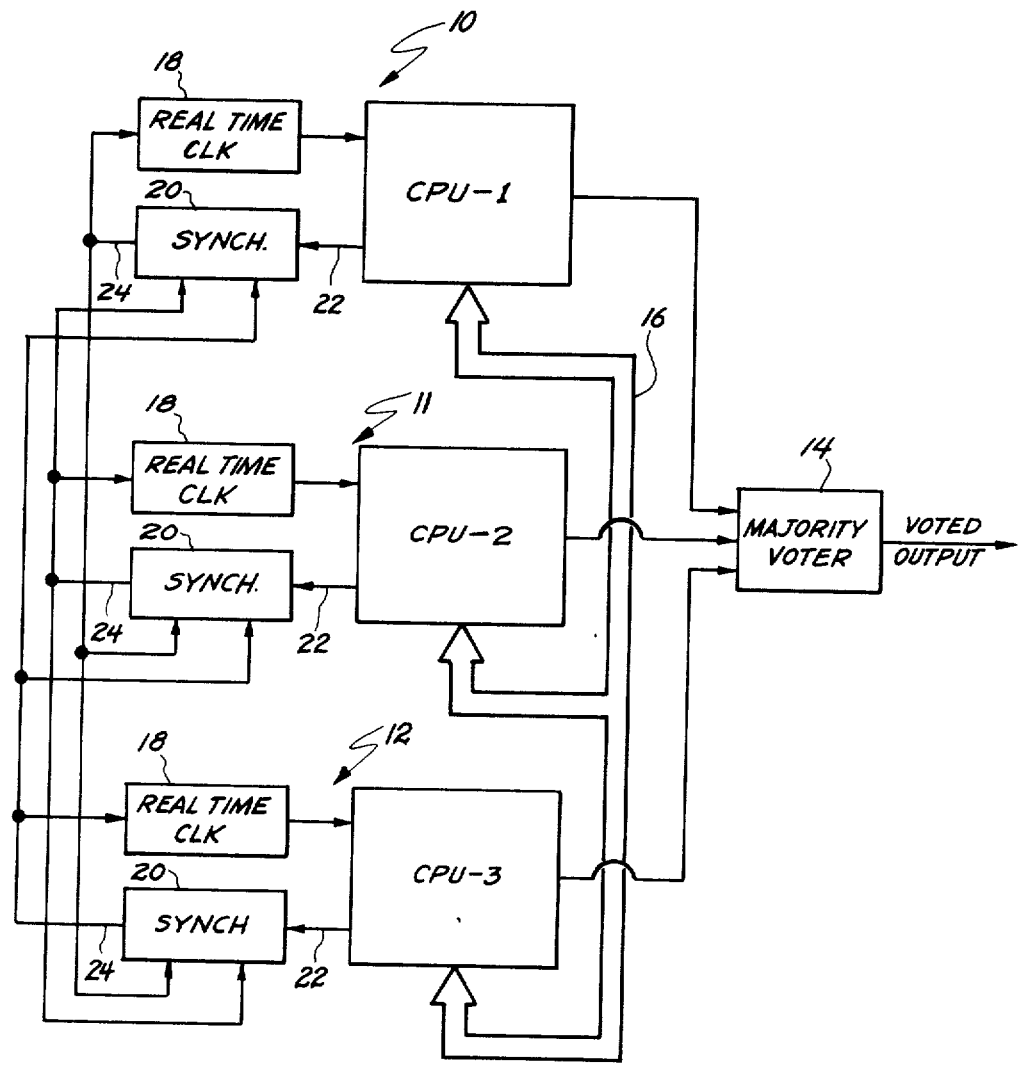
FIG. 1 is a conceptual block diagram of a multiply redundant computer system embodying the invention.

FIG. 1 illustrates conceptually a triple modular redundant processing system wherein three computer systems 10, 11, and 12 comprising computers CPU-1, CPU-2, and CPU-3 operating in parallel, separately process data and provide outputs to a majority voter circuit 14. The majority voter circuit compares the three outputs and, in turn, provides a voted output. The three computer systems may be interconnected by a high speed link 16 which interconnects the memories of the computers and enables a high speed memory dump from one or more computers to another, for example on start-up, to insure that each is performing a prescribed task with the same data. Each computer system has its own real time clock 18 which provides the requisite timing signals for its operation.

In accordance with the invention, also associated with each computer system is a synchronizer 20 which may control the real time clock 18 of its associated computer to cause the computer to resynchronize itself periodically with other computers of the system at a predetermined frame interval and to enable synchronization when the computer is brought on-line in either a cold or a warm start. Each synchronizer receives from its associated computer control signals, such as a POWER-ON RESET signal, via a line 22, outputs via lines 24 to its associated real time clock and to other computer systems SYNC FLAG and FRESH START FLAG signals, and receives SYNC FLAG and FRESH START FLAG signals from the other synchronizers in the system. The SYNC FLAG and FRESH START FLAG signals indicate the conditions of a sync flag and a fresh start flag of a computer system, i.e., whether each flag is raised (set) to a first logic level or lowered (reset) to a second logic level. Upon a sync flag being set by a synchronizer, its associated real time clock causes the computer of that system to pause in the execution of the task it was performing and to enter an idle state in preparation for resynchronism. When the sync flag is reset, program execution is restarted. Broadly stated, the synchronizers achieve frame-synchronization of their associated computers at each frame interval period by using the SYNC FLAG SET and SYNC FLAG RESET signals to cause the real time clocks to be rephased and synchronized with each other. The precise manner in which this is accomplished will be described shortly. However, it is appropriate to note at this point that each synchronizer may have nine different states A-I, at each of which a predetermined function is performed, and that the synchronizer progresses through the states in different sequences and transitions from one state to another depending upon the occurrence or nonoccurrence of predetermined events and conditions.

As noted earlier, FIG. 1 is conceptual in nature. It is intended to illustrate the environment in which the invention is employed and the overall purpose of the invention. Although FIG. 1 implies that synchronizer 20 is a separate discrete component of each computer system, and the following description will, in fact, present a hardware embodiment of the synchronizer, it will become apparent that the invention may also be implemented either totally or partially in software in each computer.

Figure 2:
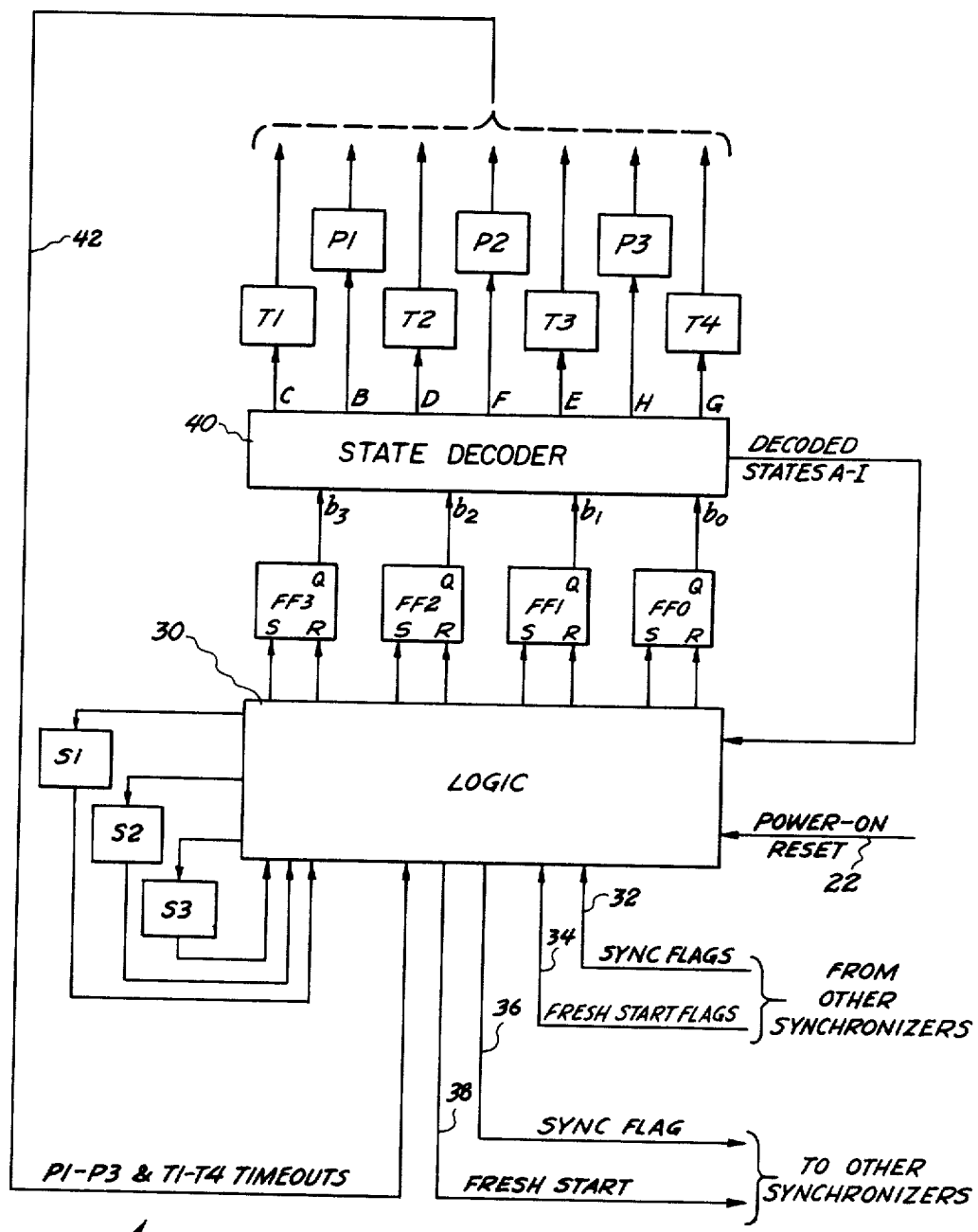
FIG. 2 is a block diagram illustrating a synchronizer in accordance with the invention.

FIG. 2 is a block diagram of a synchronizer 20 in accordance with the invention. All three of the synchronizers of the system of FIG. 1 may be identical. As shown in the figure, the synchronizer comprises combinational logic 30 (to be described more fully hereinafter) which receives a POWER-ON RESET signal via a line 22, SYNC FLAG SET and RESET signals from other synchronizers via lines 32, and FRESH START FLAG SET and RESET signals from other synchronizers via lines 34. The logic also outputs its own SYNC FLAG SET and RESET signals and FRESH START FLAG SET and RESET signals to its associated real time clock and to other synchronizers via lines 36 and 38, respectively.

The synchronizer further includes three N-bit registers S1, S2, and S3, where N is the number of computers in the system (three for the embodiment described). These registers are used to store N-bit binary words which indicate the conditions of the sync and fresh start flags of each computer, i.e., synchronizer, in the system and are loaded with the appropriate information from logic 30 when the synchronizer is in certain states. The information stored in these registers is also provided back to logic 30 for use in determining whether the conditions necessary for transitions between states exist. The meaning of the information stored in these registers is as follows:

S1=(f1, f2, f3)=the set of computers with sync flags set, where bit f1 designates CPU-1, bit f2 designates CPU-2, and bit f3 designates CPU-3. Each bit is equal to 1 if its corresponding CPU set its sync flag when it should have, and is equal to 0 if the CPU did not set its sync flag when it should have.

S3=(f1, f2, f3)=the set of computers with sync flags reset, where, as above, the three bits designate the three CPU's, and each has a value of 1 if its associated CPU reset its sync flag when it should have and has a value of 0 if the CPU did not reset its sync flag when it should have.

S2=(f1, f2, f3)=set of computers with sync flags that properly transitioned from 1 to 0 and then back to 1, i.e., first set and then reset, during the synchronization procedure, where the three bits correspond to the three CPU's, and each has a value 1 if the sync flag of the associated CPU transitioned correctly and a value of 0 if the sync flag did not transition correctly.

From the above definitions, S1=(111) implies that all three CPU's set their sync flags to a 1 when they should have. S3=(101) implies that CPU's 1 and 3 reset their sync flags to 0 but that CPU-2 did not reset its sync flag as it should have.

Set S2 corresponds to the intersection (logic AND function) of sets S1 and S3, and may be written as $$S2 = S1 \cdot S3$$
$$= (111) \cdot (101)$$
$$= (101)$$

For these values of S1 and S3, S2 indicates that CPU's 1 and 3 first set their sync flags (since their corresponding bits in S1 are equal to 1) and then reset their sync flags (since the corresponding bits in S3 have the value 1), and that CPU-2 set its sync flag (f2=1 in S1), but failed to reset the sync flag (f2=0 in S3).

From the foregoing, it will be appreciated that it is more convenient to consider S1, S2 and S3 as defining sets or groups of CPU's which obeyed certain rules rather than as registers whose contents are 1's or 0's depending upon whether the corresponding CPU did or did not obey the rule or pass a certain test. Since, as will be described hereinafter, the conditions necessary for the synchronizers to transition between certain states depends upon the result of a comparison between certain of the sets S1, S2 and S3, it is convenient to define what is meant by two sets being equal, one set being greater than or less than another, and the intersection and union of two sets.

Two sets are equal if all members of one set are also members of the other, and vice versa. Thus, if S1=(111) and S2=(111) then S1=S2. S1 is greater than S2 if all members of S2 are also members of S1 and if there are some members of S1 which are not members S2. Thus, if S1=(111) and S2=(011) then S1>S2 (S1 is greater than S2), since f1=1 in S1 and is thus a member of S1, but f1=0 in S2 and is therefore not a member of S2. Also, if S1=(110) and S2=(011) then S1 is not greater than S2. The intersection (.) of two sets is the set consisting of members which belong to both sets. Thus, if S1=(111) and S3=(011) then the intersection of S1 and S3 is S1.S3=(011), which, as noted above, is the bit-by-bit logical AND combination of the sets. Similarly, the union (+) of two sets is the bit-by-bit logical OR combination of the sets.

Figure 3:
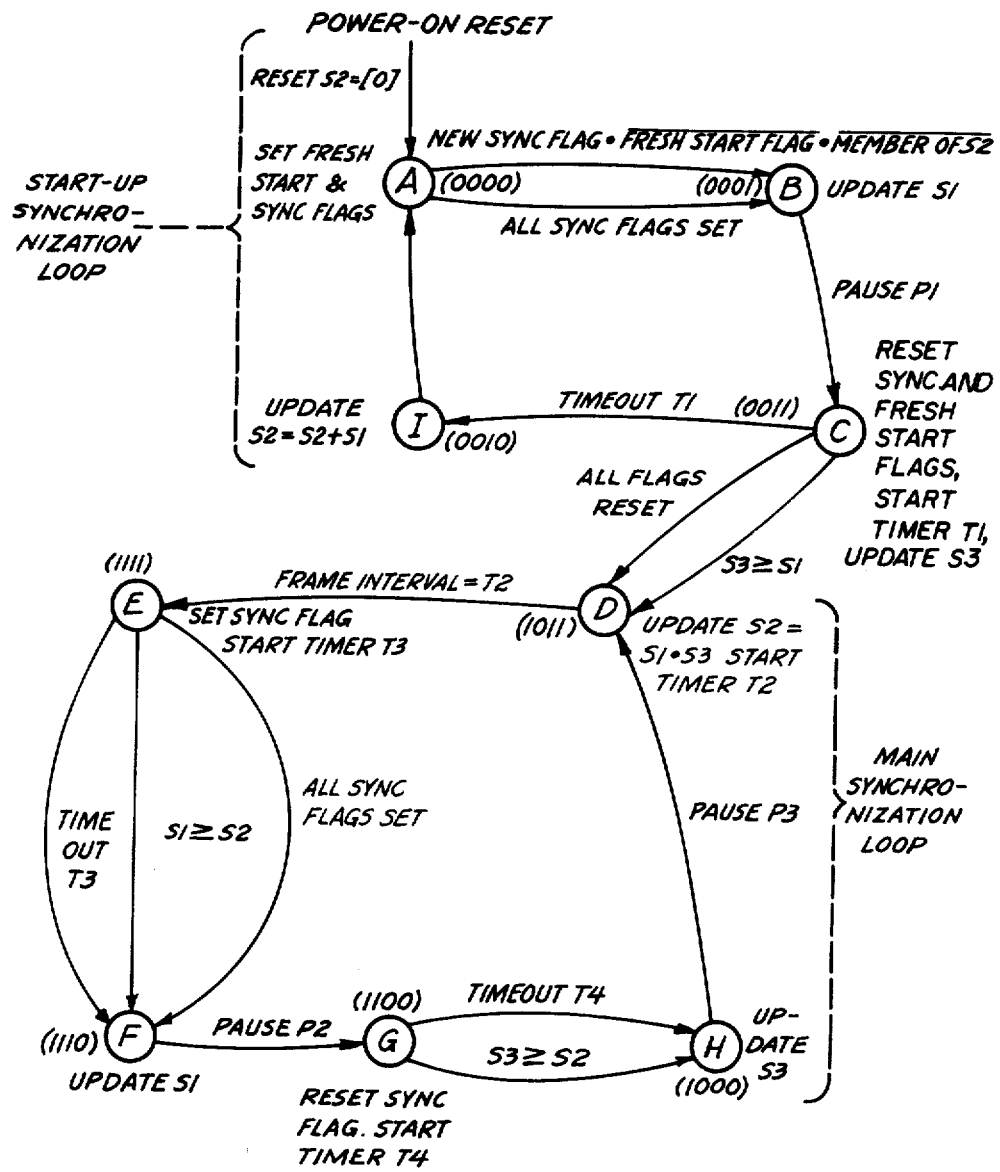
FIG. 3 is a state diagram illustrating the synchronization procedures of the invention.

Referring again to FIG. 2, logic 30 outputs signals to the set (S) and reset (R) inputs of four flip-flops (FF3-FF0), the Q outputs of which consititute a four-bit binary code ($b_3$, $b_2$, $b_1$, $b_0$), corresponding to the state of the synchronizer. The following Table indicates a preferred encoding of the states (the encoding is also illustrated in FIG. 3):

TABLE

| SYNCHRONIZER STATE ENCODING | | | | | | | | | |
|---|---|---|---|---|---|---|---|---|---|
| State | ($b_3$ | $b_2$ | $b_1$ | $b_0$) | State | ($b_3$ | $b_2$ | $b_1$ | $b_0$) |
| A | 0 | 0 | 0 | 0 | F | 1 | 1 | 1 | 0 |
| B | 0 | 0 | 0 | 1 | G | 1 | 1 | 0 | 0 |
| C | 0 | 0 | 1 | 1 | H | 1 | 0 | 0 | 0 |
| D | 1 | 0 | 1 | 1 | I | 0 | 0 | 1 | 0 |
| E | 1 | 1 | 1 | 1 | | | | | |

The Q outputs from flip-flops FF0-FF3 are fed to a state decoder 40, which may simply comprise a 4-line to 16-line decoder, which decodes a 4-bit binary code from the flip-flops and causes one of nine output lines corresponding to the state represented by the code to assume a logic 1 level. The decoded states from the state decoder are supplied back to logic 30, as shown in FIG. 2. In addition, the lines corresponding to certain ones of the states are supplied to the start inputs of four timers T1-T4 and to three pause or delay circuits P1-P3, as indicated in the figure. Upon the synchronizer entering one of these states, the corresponding line from the state decoder goes high and starts the appropriate timer or pause circuit. The timers and pause circuits may be implemented in any convenient manner, such as, for example, as shift registers or counters driven by timing pulses from the real time clock. When a timer or pause circuit times out, its output goes high to indicate the expiration of the time interval timed by the timer or pause circuit, and these outputs are fed back to logic 30 via lines 42 where they are used, in a manner to be described shortly, as part of the synchronization procedure.

FIG. 4 illustrates in more detail a portion of logic 30 of the synchronizer. As shown, the logic may comprise four groups of digital logic elements composed of AND and OR gates associated with the four flip-flops FF0-FF3. The inputs to the gates comprise the decoded state signals from state decoder 40 corresponding to states A-I, the timeouts from timers T1-T4 and pause circuits P1-P3, the results of comparisons between two of the sets S1, S2, and S3, signals representing the conditions of the sync and fresh start flags, and the POWER-ON reset signal. The logic functions performed by the groups of gates control the set (S) and reset (R) inputs of the flip-flops, and the Q outputs of the flip-flops represent the binary code corresponding to the states, which is decoded in the 4-line to 16-line state decoder 40 as previously described.

As noted above, the synchronization processes of the invention involve sequences of transitions between the various states A-I. Each state represents a particular condition of the synchronizer which depends upon its initial state or condition and the sequence of events which has occurred since. At each state, predetermined functions are performed, and the transition from one state to another depends upon predetermined events occurring and predetermined conditions being satisfied. Prior to describing the logic of FIG. 4, the synchronization processes of the invention, including the states and the criteria necessary for transition from one state to another, will first be described.

FIG. 3 is a state diagram which illustrates the synchronization processes of the invention. Each of the nine states A-I is represented by a bubble or circle and a letter designating the state. Adjacent to each bubble the binary code corresponding to that state is indicated. The arrows between bubbles indicate transitions between states and the events labeled on the arrows are the necessary conditions that must be fulfilled for transition between the states along the path indicated by the arrow. In addition, adjacent to each state the functions which are performed in that state are indicated. The synchronizer will remain in a given state until the conditions necessary for transition to the next state occur.

Referring to the state diagram of FIG. 3, the upper loop comprising the sequence of transitions between states A-B-C-I-A illustrates a preferred form of the start-up synchronization process for either a cold start or a warm start. In a cold start, the entire computer system is powered off, each computer is brought up one by one, and the computers are synchronized. In a warm start, a computer which had been taken off-line is brought back up and synchronized with the on-line computers. The lower loop of FIG. 3 comprising the sequence of transitions between states D-E-F-G-H-D illustrates the main frame synchronization process of the invention in which the computers are periodically resynchronized with one another at a predetermined frame interval. Each synchronizer performs the synchronization processes illustrated in FIG. 3.

Considering first the start-up synchronization loop, assume that all computers are initially off and are powered up in an arbitrary sequence. As each computer is powered up, a POWER-ON RESET signal is produced and the synchronizer enters state A. In state A, the synchronizer resets register S2 to the null set $[0]=(000)$, and sets a fresh start flag and a sync flag. The synchronizer will remain in state A until the occurrence of either of the indicated conditions necessary for transition to state B. The condition All Sync Flags Set (the lower path) corresponds to a cold start. The condition for transition to state B via the upper path New Sync Flag AND Not Fresh Start Flag AND Not a Member of S2 is for a warm start, since on a warm start the computers which are already running will not set a fresh start flag. In a warm start, the synchronizer waits until it sees another sync flag set and the corresponding fresh start flag not set, indicating a computer which is already running. The upper path between states A and B can never be taken on a cold start, since when a computer comes on-line its synchronizer will always set a fresh start flag.

In state B, the synchronizer updates the information in register S1 to correspond to the set of computers with sync flags set. After a pause P1, which insures that the other synchronizers will have time to see each other's sync flags and update their S1 registers, a transition to state C occurs. In state C, the synchronizer resets its sync flag and fresh start flag, starts timer T1, and updates the information in register S3 corresponding to the set of computers with sync flags reset.

In order to transition to state D, either of two conditions must exist. One condition is All Sync Flags Reset, i.e., $S3=[1]=(111)$. The other condition is that the set of computers which reset their sync flags must be greater than or equal to the set of computers with sync flags set, i.e., $S3 \geq S1$. Since on a cold start $S1=(111)$, S3 must equal (111) for the latter condition to be satisfied. On a warm start, S1 could be less than (111), e.g., (011), in which case the synchronizer would transition to state D if S3 were greater than or equal to S1, i.e., $S3=(111)$ or (011). If neither of the conditions necessary for transition to state D exists, the synchronizer will transition to state I after timeout T1. In state I, S2 is updated to be equal to the union of set S2, which was initially the null set, and the set S1, i.e., $S2=S2+S1$. From state I, the synchronizer immediately transitions to state A and reexecutes the start-up synchronization loop using the new value of S2 determined in state I.

The purpose of the portion of the condition Not A Member of S2 ($\overline{S2}$) for transition between states A and B on a warm start is to insure that when a new computer comes on-line it does not attempt to synchronize with a computer which had failed with its sync flag set. Since the failed computer would be unable to reset its sync flag in state C, the bit of S1 corresponding to that computer would remain set and, upon transition to state I, S2 would be updated to include the failed computer. Accordingly, the portion of the condition $\overline{S2}$ for transition between states A and B along the upper path would not be satisfied.

At state D, the start-up procedure has been completed and the computers are running synchronously. Upon entering state D, the register S2 is updated to equal the intersection of S1 and S3 ($S2=S1.S3$). If all three computers synchronized correctly, then $S2=(111)$. Since S2 is the set of synchronizers whose sync flags transitioned correctly, S2 may be thought of as the set of good computers, i.e., those capable of transitioning their sync flags in both directions at the proper time.

Upon entering state D, timer T2 is also started. This timer establishes the basic frame interval (10 msec., for example) at which the resynchronization process is repeated. Upon timeout of timer T2, the synchronizer enters state E, at which it sets its sync flag and starts timer T3. As previously indicated, upon the sync flag being set, the computer pauses in the execution of the task it was performing, and the sync flag informs other computers that it is ready for resynchronization. The synchronizer enters state F upon any of the three conditions illustrated in the figure occurring, i.e., All Sync Flags Set, $S1 \geq S2$, or timer T3 timing out. In state F, S1 is updated and the synchronizer transitions to state G after pause P2. In state G, the sync flag is reset and timer T4 is started. Upon the occurrence of either $S3 \geq S2$ or timer T4 timing out, the synchronizer transitions to state H where it updates S3, and then transitions back to state D after pause P3. Upon entering state D, S2 is updated with a new value corresponding to the intersection of S1 and S3, i.e., the set of computers which first set and then reset their sync flags during the just completed transitions around the main synchronization loop. Timer T2 is also restarted, and, upon timeout of T2, the synchronization process is repeated.

Certain conditions are necessary for the lengths of the timeouts and pauses. If the maximum expected variation in the frame interval timer is dt, then the timeouts T3 and T4 must satisfy the following conditions:

$$dt < T3 \tag{1}$$

$$dt < T4 \tag{2}$$

$$T3 < T4 \tag{3}$$

The need for the first two conditions is apparent. Condition (3) is necessary since a faulty synchronizer could fail in such a way as to present two different values for the sync flag to different good synchronizers and, in the absence of condition (3), cause them to diverge. The conditions on the duration of pauses P2 and P3 are as follows:

$$dt < P2 \quad (4)$$

$$dt < P3 \quad (5)$$

Conditions (4) and (5) afford time for the logic to update S1 and S3 and to output new values based upon the new inputs. In a software rather than a hardware implementation of the process, these conditions imply that P2 and P3 must be longer than the time required to execute a loop which reads the inputs and performs the checks for the exit conditions to be valid for transition to the respective states. In addition, in a software implementation, P1 must be shorter than P2 by the time taken to execute the start-up synchronization loop. This condition arises due to the possibility of a warm start in the presence of faulty synchronizers. Otherwise, the newly started computer may fall out of synchronization with the good computers on the next synchronization cycle.

The synchronization process illustrated in FIG. 3 is impervious to "stuck at" type faults. Assume, for example, that CPU-1 fails with its sync flag stuck at 0. The next time that the remaining synchronizers go from state D to E and set their sync flags, waiting for the condition $S1 \geq S2$ to occur, that condition will fail since $S2=(111)$ and $S1=(011)$. Hence, both of the other synchronizers will timeout after T3 and enter state F. From here, they will proceed normally to states G, H and D. In state D, S2 will be updated to include the intersection of S1 and S3, i.e., $S2=(011).(111)$. Therefore, the next time around the loop, the synchronizers of CPU-2 and CPU-3 will only look for $S1=011$ and will only attempt to synchronize with each other and not with the computer that has failed. Hence, they will not have to wait for timeout T3 and will transition from state E to state F via the middle path since S1 and S2 would be equal. If, on the other hand, CPU-1 had failed with its sync flag stuck at 1, then immediately after failure, the transition from state E to state F would have proceeded normally, i.e., without timeout T3, but the condition $S3 \geq S2$ for transition from state G to state H would fail and this transition would occur upon timeout of T4. Thereafter, S2 would be updated to (011), as above, so that the next time through the loop the condition $S3 \geq S2$ would be satisfied and the transition from state G to state H would occur without the necessity of waiting for timeout T4.

From the foregoing description of the synchronization processes of the invention, the operation of logic 30 illustrated in FIG. 4 can be readily understood. The configuration of logic gates which drives the set and reset inputs of each of flip-flops FF0–FF3 and the inputs to these logic gates are selected so as to cause the Q outputs of the flip-flops to assume, at the appropriate times, logic values corresponding to the state of the synchronizer. As previously noted, the inputs to the logic gates comprise the synchronizer states A-I, the timeouts from the timers and pause circuits, the POWER-ON RESET signal, and the predetermined conditions for transition between certain of the states. The state inputs to the gates are derived from the nine output lines of the state decoder which are fed back to logic 30, and the timeouts are derived from the outputs of the timers and pause circuits which are also fed back to logic 30. The other predetermined conditions required for transitions between states which form inputs to the gates primarily involve information stored in registers S1, S2, and S3, and may be derived from combinational logic circuits 50 included within logic 30.

As indicated in FIG. 4, logic 50 receives the outputs of registers S1, S2, and S3, the POWER-ON RESET signal, and the sync and fresh start flags. At the appropriate times, i.e., states, logic 50 updates the information stored in registers S1, S2, and S3 based upon the conditions of the sync flags, compares the outputs of the registers to detect the conditions $S3 \geq S1$, $S3 \geq S2$, and $S1 \geq S2$, and compares the values of the bits stored in registers S1 and S3 to detect the conditions All Sync Flags Set, All Sync Flags Reset, and New Sync Flags Set. Logic 50 also functions to detect the conditions Not Fresh Start Flag and Not A Member of S2. Finally, logic 50 operates to form the intersection of sets S1 and S3 to update S2 at state D, and forms the union of sets S2 and S1 to update set S2 at state I. The functions performed by logic 50 may be readily implemented in a straight-forward fashion by those skilled in the art using AND and OR logic gates or in software. The sync flags and fresh start flags are preferably derived from the outputs of flip-flops which are set and reset at appropriate times by the state signals from the state decoder.

As previously noted, the outputs of flip-flops FF3–FF0 designate the state of the synchronizer. Upon power-on of a computer, its synchronizer enters state A, corresponding to 0000. Accordingly, the POWER-ON RESET signal (a logic 1) is applied to the reset (R) input of each of the flip-flops, either directly, as in the case of FF3, or as one input of an OR gate 52, 54, or 56 connected to the reset input as shown for FF0, FF1, and FF2, respectively.

Considering FF0, the output of which corresponds to $b_0$, and the state encoding given in the foregoing Table, bit $b_0$ is set to 0 not only upon power-on and the synchronizer entering state A, but also upon the synchronizer transitioning from state C to state I and from state E to state F. Accordingly, OR gate 52 has two additional inputs corresponding to the conditions indicated in FIG. 3 as necessary for transitions between states C and I and between states E and F. For the transition between states C and I, OR gate 52 has as an input an output of AND gate 58 which has as inputs the state signal C and the timeout signal from timer T1. Thus, when the synchronizer is in state C and timer T1 times out, AND gate 58 will cause FF0 to be reset, resetting $b_0$ to 0. Similiarly, OR gate 52 has as another input the output of an AND gate 60, one input of which is the state signal E and the other input of which is the output of an OR gate 62, which has as inputs signals corresponding to $S1 \geq S2$, T3, and All Sync Flags Set. As can be seen from FIG. 3, any one of these conditions is required for transition between states E and F.

The output of flip-flop FF0 is required to change from 0 to 1 upon the synchronizer transitioning from state A to state B and from state H to state D. Accordingly, the set input of the flip-flop may be derived from the output of an OR gate 64 having as inputs the conditions necessary for transition from state A to state B and for transition from state H to state D. One input is connected to the output of an AND gate 66 which has as inputs the state signal A and the output of an OR gate 68. OR gate 68 has two inputs. One is the output of an AND gate 70 which has as inputs the signals New Sync Flag Set, Not Fresh Start Flag, and Not A Member of S2 ($\overline{S2}$) all of which, as can be seen from FIG. 3, are required for transition between states A and B via the upper path. The other input to OR gate 68 is the signal All Sync Flags Set, which is the condition required for transition between states A and B via the lower path. Thus, the gates 66, 68 and 70 form the logic for transitions from A to B.

The other input to OR gate 64 is the output of an AND gate 72 which has an inputs the state signal H and the timeout of pause circuit P3, which are the conditions required for transition between states H and D.

Next, considering the output of FF1, bit $b_1$ is set to 0 upon entering state A, as previously described, as well as upon the synchronizer transitioning from state I to state A and from state F to state G upon timeout of pause P2. Accordingly, the other inputs to OR gate 54 comprise the state signal I and the output of an AND gate 74 having as inputs the state signal F and the signal P2.

Bit $b_1$ (FF1) is set from 0 to 1 upon the synchronizer transitioning between states B and C and between the states H and D upon timeout of pause circuits P1 and P3, respectively. Thus, the set input of FF1 may be derived from the output of an OR gate 76 having as one input the output of an AND gate 78 driven by the state signal B and the pause signal P1, and having as another input the output of an AND gate 80 driven by the state signal H and the pause signal P3.

For flip-flop FF2, bit $b_2$ is set to 0 upon the synchronizer transitioning from state G to state H. Thus, OR gate 56 may have as an input the output of an AND gate 82 which has inputs the state signal G and the output of an OR gate 84. OR gate 84 is driven by the signals T4 and $S3 \geq S2$, either of which, as shown in FIG. 3, is a condition necessary for transition between states G and H. Bit $b_2$ is set to a 1 upon the synchronizer transitioning from state D to state E. Accordingly, the set input of FF2 may be derived from the output of an AND gate 86 which has as inputs the state signal D and the timeout signal T2.

Finally, the output of flip-flop FF3 corresponding to bit $b_3$ is set to 1 upon the transition of the synchronizer from state C to state D. Accoringly, the set input of the flip-flop may be derived from the output of an AND gate 88 which has as one input the state signal C and which has as another input the output of an OR gate 90, the inputs of which comprise the signals All Sync Flags Reset and $S3 \geq S1$, either of which is required for the transition between states C and D.

From the foregoing, and as previously indicated, it will be appreciated by those skilled in the art that the invention may be implemented entirely in software, as well as partially in software and partially in hardware. Moreover, while a preferred embodiment of the invention has been shown and described, it will be appreciated by those skilled in the art that changes may be made in this embodiment without departing from the principles and spirit of the invention, the scope of which is defined in the appended claims.

What is claimed is:

1. A method of synchronizing a plurality of computer systems at predetermined frame intervals, the method being performed in each computer system and comprising the steps of instructing, at each frame interval, said computer system to set a sync flag and to enter a first state in which program execution is halted; determining which computer of said plurality have set a sync flag and defining a corresponding first set of computer systems with sync flags set; comparing the first set to a second set of computer systems which during a prior frame interval had set and then reset sync flags, and transitioning to a second state upon a first predetermined condition being satisfied; transitioning from the second state to a third state after a first predetermined pause and instructing the computer system to reset its sync flag and restart program execution; determining, in the third state, which computer systems of said plurality have reset sync flags and defining a corresponding third set of computer systems; comparing the third set with the second set and transitioning to a fourth state upon a second predetermined condition being satisfied; transitioning to a fifth state after a second predetermined pause; updating, in the fifth state, the second set to correspond to those computer systems which had set and then reset sync flags during said foregoing transitioning steps; and repeating all of the foregoing steps at each subsequent frame interval.

2. The method of claim 1, wherein said first predetermined condition comprises the first set being greater than or equal to the second set.

3. The method of claim 1, wherein the first predetermined condition comprises the sync flags of all computer systems of the plurality being set.

4. The method of claim 1 further comprising transitioning to the second state after a predetermined timeout interval if said first predetermined condition is not satisfied.

5. The method of claim 1, wherein said second predetermined condition comprises the third set being greater than or equal to the second set.

6. The method of claim 1 further comprising transitioning from the third state to the fourth state after a predetermined timeout interval upon the second predetermined condition not being satisfied.

7. The method of claim 1 further comprising, upon power-on of said computer system, defining said second set of computer systems to comprise a null set; instructing said computer system to set a fresh start flag and its sync flag; transitioning to a sixth state upon a third predetermined condition being satisfied; determining in said sixth state the computer systems having sync flags set and updating the first set correspondingly; transitioning to a seventh state after a third predetermined pause; instructing said computer system to reset its sync flag and its fresh start flag and commence program execution; and transitioning to said fifth state upon a fourth predetermined condition being satisfied.

8. The method of claim 7, wherein said third predetermined condition comprises either all computer systems of said plurality having sync flags set or one of said computer systems, not a member of said second set, having its sync flags set and its fresh start flag not set.

9. The method of claim 7 wherein said fourth predetermined condition comprises either all computer systems of said plurality having their sync flags reset or the third set being greater than or equal to the first set.

10. Apparatus for synchronizing a plurality of computer systems at predetermined frame intervals which operates by transitioning between states in a given sequence comprising, for each computer system, means for providing and starting a frame interval timer for timing one frame interval; means for instructing the computer system after said frame interval has timed out to set a sync flag and to enter a first state at which program execution is halted; means for detecting a first set of computer systems which have set their sync flags; means for comparing the first set to a second set of computer systems which had set and then reset their sync flags during a prior frame interval; means responsive to the comparing means for instructing the computer system to transition to a second state upon a first predetermined condition being satisfied; means for instructing the computer system to transition from the second state to a third state after a first predetermined pause and to reset its sync flag and to restart program execution; means for detecting a third set of computer systems having sync flags reset; means for comparing the third set with the second set and for instructing the computer system to enter a fourth state upon said comparing satisfying a second predetermined condition; means for instructing the computer system to enter a fifth state after a second predetermined pause; and means operating in the fifth state for redefining the second set of computer systems as those which had set and then reset their sync flags during said transitions between states.

11. The apparatus of claim 10 further comprising means for providing first and second output signals to all other computer systems in said plurality of computer systems which are indicative respectively, of set and reset conditions of the sync flag, and wherein both said detecting means comprises means for storing the first and second signals and corresponding signals from other computer systems as respective first and second multi-bit binary words, each bit of which corresponds to a particular computer system and has a value corresponding to the condition of the sync flag of such computer system, the first and second binary words corresponding, respectively, to said first set and said third set.

12. The apparatus of claim 11 further comprising means for combining the first and second binary words bit-by-bit in a logical AND operation to produce a third multi-bit binary word corresponding to said second set, the storing mean including means for storing the third binary word.

13. The apparatus of claim 12, wherein both said comparing means comprise means for comparing said binary words.

14. The apparatus of claim 13, wherein said first predetermined condition comprises either the first binary word being greater than or equal to the third binary word, or each bit of the first binary word being equal to a value indicative of a sync flag being set, and wherein said second predetermined condition comprises the second binary word being greater than or equal to the third binary word.

15. The apparatus of claim 14 further comprising means for instructing the computer system to transition to the second state after a first predetermined period of time upon the first predetermined condition not being satisfied, and means for instructing the computer system to transition to the fourth state after a second predetermined time upon said second predetermined condition not being satisfied.

16. The apparatus of claim 10 further comprising means operating upon power-on of the computer system for setting a fresh start flag and a sync flag; means for instructing the computer system to transition to a sixth state upon a third predetermined condition being satisfied; means for determining in the sixth state the computer systems having sync flags set and for updating said first set correspondingly; means for instructing the computer system to transition to a seventh state after a third predetermined pause; and means for instructing the computer system to reset the sync flag and the fresh start flag and to transition to the fifth state upon a fourth predetermined condition being satisfied.

17. The apparatus of claim 16 further comprising means for providing another timer for etablishing a predetermined timeout interval, and means operating in the seventh state upon said fourth predetermined condition not being satisfied and said another timer timing out for instructing the computer system to transition to an eighth state at which the second set is updated to include computer systems which had set sync flags in the sixth state and to transition to a ninth state at which the computer system is instructed to set its fresh start and sync flags and await occurrence of said third predetermined condition for transition to the sixth state.

18. The apparatus of claim 17, wherein said third predetermined condition comprises either the sync flags of all computer systems being set or a new sync flag being detected and a corresponding fresh start flag not being detected and the system having the new sync flag not being a member of the second set.

19. The apparatus of claim 17, wherein said fourth predetermined condition comprises either the sync flags of all computer systems being reset or the third set being greater than or equal to the first set.

20. The apparatus of claim 16, further comprising means for providing state signals corresponding to each of said states, and wherein all of said instructing means, said detecting means, and said comparing means comprise a logic circuit formed to combine said state signals, signals from each computer system representative of condition of the sync flag and fresh start flag of such computer systems, and signals representative of said first to fourth predetermined conditions, the logic circuit outputting signals corresponding to combinations of said signals, and the state signal providing means being driven by output signals from the logic circuit.

* * * * *